Aug. 1 3,524,011

HT MODULATORS

Filed March 29, 1968
2 Sheets-Sheet 1

Inventor
Adrianus Korpel

By Francis W. Crotty
Attorney

Aug. 11, 1970  A. KORPEL  3,524,011
LASER COLOR DISPLAY UTILIZING ACOUSTICAL LIGHT MODULATORS
Filed March 29, 1968  2 Sheets-Sheet 2

Inventor
Adrianus Korpel
By Francis W. Crotty
Attorney

United States Patent Office 3,524,011
Patented Aug. 11, 1970

3,524,011
LASER COLOR DISPLAY UTILIZING ACOUSTICAL LIGHT MODULATORS
Adrianus Korpel, Prospect Heights, Ill., assignor to Zenith Radio Corporation, Chicago, Ill., a corporation of Delaware
Filed Mar. 29, 1968, Ser. No. 717,198
Int. Cl. H04n 9/14; G02f 1/34
U.S. Cl. 178—5.4         10 Claims

ABSTRACT OF THE DISCLOSURE

A polychromatic display system uses three light beams of different colors such as red, green and blue. Each beam is modulated in a light-sound interaction cell by video information representing its assigned color field and the beams are deflected by similar cells to accomplish scanning. The deflected beams are projected upon a screen and are superposed to achieve image reproduction in simulated natural color. Because of the dependence of diffraction in the interaction cells upon the wavelength of the light beam, there is a tendency toward misregistration which may be compensated by adjusting the magnification power in each of the three light paths.

Compensation may also be achieved by arranging with the deflecting cell a separate cylinder lens of appropriate optical properties. Constructing the deflection cell in the nature of a prism or changing the acoustic propagation velocities of the deflection cells in relation to the light wavelengths also effects the necessary compensation. Where the deflection cells have the same propagating velocities, the sweep ranges of the cells may be adjusted to effect compensation.

---

The present invention pertains to polychromatic display systems. More particularly, it relates to projection systems employing light-sound interaction for the modulation and deflection of beams of differently-colored light.

My copending application Ser. No. 600,430, filed Dec. 9, 1966, describes and claims a display system that projects a monochrome image onto an image screen. That approach is also explained and illustrated in an article by Korpel et al. entitled "A Television Display Using Acoustic Deflection and Modulation of Coherent Light," Applied Optics, vol. 5, No. 10, October 1966, pages 1667–1675. Such a system includes a laser productive of a coherent light beam of a single color. The beam is first modulated by causing it to interact with and be diffracted by sound waves that exhibit intensity variations corresponding to video modulation. Subsequently, the beam is caused to be angularly deflected by again interacting with a train of acoustic waves the frequency of which is caused to repetitively vary and thus effect scanning of the modulated beam. The scanning frequencies are, of course, properly related to the line and field periods in which the video information is normally presented and the modulated and deflected beam is projected onto an image plane where it reproduces a picture representing the video information.

As illustrated in the aforesaid article, this system has been employed successfully to display a reasonably satisfactory monochromatic television picture. Moreover, refinements are indicated that may be included to produce a picture of extremely-high quality. Those familiar with color television reproduction techniques will recognize immediately the possibility of employing two or three such systems more or less in parallel operation to produce a multi-color image. For example, one form of known color reproduction technique produces three separate images respectively colored red, green and blue. These different color images are then superimposed optically upon an image screen, as by the use of a dichroic mirror, so as to develop a multi-color or polychromatic picture. Analogously, three different lasers, individually productive of red, green and blue light, may be employed together with three different modulation, deflection and projection systems to produce a corresponding plurality of red, green and blue images which are superimposed in order to form a picture in simulated natural color. However, in employing this and related approaches, difficulty is encountered with registration in the picture resulting from the superpositioning of different individually-colored images. Misregistration occurs because the angle of diffraction effected by light-sound interaction is in itself a function of the wavelength of the light so that the different laser beams which represent different wavelengths experience different rates of deflection in operation of the three beam system.

It is, accordingly, a general object of the present invention to provide a polychromatic display system in which such registration difficulties are overcome.

It is another object of the present invention to provide a polychromatic display system in which such difficulties are overcome while maintaining efficiency and stability of operation.

One specific object of the present invention is to simplify such a system by enabling the use of common projection optics.

Another specific object of the present invention is to correlatively combine the deflecting and projecting components.

A related object of the present invention is to provide apparatus in which a common component is employed to effect modulation of the light beams of different colors.

In accordance with the invention, a polychromatic image display system comprises means for effectively producing a plurality of beams of monochromatic light individually of different respective wavelengths and related to one another to simulate natural color by superpositioning. Modulating means direct across those beams a corresponding plurality of acoustic waves individually having intensity variations that represent an assigned color field of an image being translated, thereby to develop a plurality of correspondingly modulated light beams. Deflection and imaging means are disposed downbeam of the modulating means for directing across the modulated beams acoustic waves of sound energy the frequency of which varies cyclically over a predetermined range to effect periodic scanning displacement of the modulated beams in accordance with a predetermined pattern and also for imaging the deflected beams upon an image plane spaced downbeam of the deflecting beams. Optical means are included in the deflection and imaging means to effect superpositioning of the images of the deflected beams in the image plane. The diffraction effect of the modulating and deflecting means is a function of the wavelength of the light beam being operated upon and tends therefore to cause misregistration of the superposed images. Accordingly, additional means are included in the modulating or deflecting means for compensating the dependence of the diffraction effect on wavelength to avoid misregistration in the superposed images.

The features of the present invention which are believed to be novel are set forth with particularity in the appended claims. The invention, together with further objects and advantages thereof, may best be understood, however, by reference to the following description taken in connection with the accompanying drawings in the several figures of which like reference numerals indicate like elements and in which:

Figure 1:
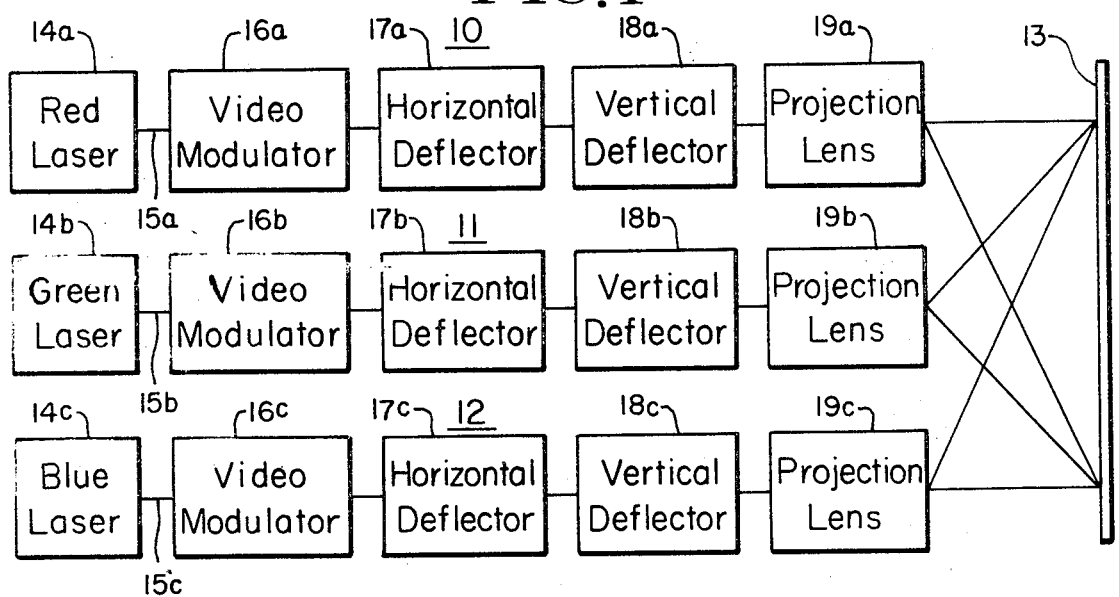
FIG. 1 is a block diagram of a polychromatic display system.

The polychromatic image display system of FIG. 1 includes three monochromatic image display systems 10, 11 and 12, capable of producing images in three respectively different colors, with each projecting an image onto a plane defined by an image screen 13. When those different-colored images are superimposed upon screen 13, a multi-color picture is developed. System 10 includes a source 14a of substantially monochromatic light; as shown, it is a laser productive of a beam 15a of red light. Beam 15a first traverses a video modulator 16a following which it is deflected by a horizontal deflector 17a and then a vertical deflector 18a. Finally, the light from deflector 18a is delivered to a projection lens 19a that focuses or images a red-colored picture upon the surface of screen 13.

System 11 employs a similar series of components acting upon a beam 15b of green-colored light produced by a laser 14b. Correspondingly, the different major components are denominated by the same number as in the case of system 10 except for the use of an identifying letter b. Analogously, a beam of blue light is produced by a laser 14c in a similar system 12 having like major components designated by numerals 16–19 plus an identifying letter c. In subsequent figures directed to a component that may be used to perform a given function of any of the three monochromatic systems in FIG. 1, a numeral is utilized to denominate that component but the accompanying letter is omitted. For example, FIG. 2 depicts a video modulator 16 which will be understood to represent any one of modulators 16a, 16b and 16c of FIG. 1.

In overall operation, the composite system of FIG. 1 develops three pictures respectively of red, green and blue light each of which represents the corresponding red, green and blue image field of a multi-color picture. As mentioned in the introduction, such a picture will appear on screen 13 when the three different-colored images are superimposed. With the three monochromatic systems 10, 11 and 12 laterally spaced from the axis of the composite system as illustrated at least the outer two systems 10 and 12 develop individually images in which the light paths to one side of image screen 13 are shortened as compared with those to the other side of the screen; that is, the lateral spacing introduces a degree of astigmatism which is exaggerated in FIG. 1 by reason of the unusually short projection distance shown as compared to the amount of spacing between the three different systems. Nevertheless, whatever degree of astigmatism is introduced by such an arrangement is readily compensated by the inclusion within projection lenses 19a and 19c of astigmatic optical elements well known in the art.

The basic nature of the modulation and deflection components in each of systems 10, 11 and 12 is the same as that employed in the monochromatic display systems of the copending application and the article mentioned in the introduction. While those references include discussion of various refinements and improvement that also may be included in the systems herein presented, it will suffice for present purposes to direct attention only to the more basic mechanisms involved.

Figure 2:
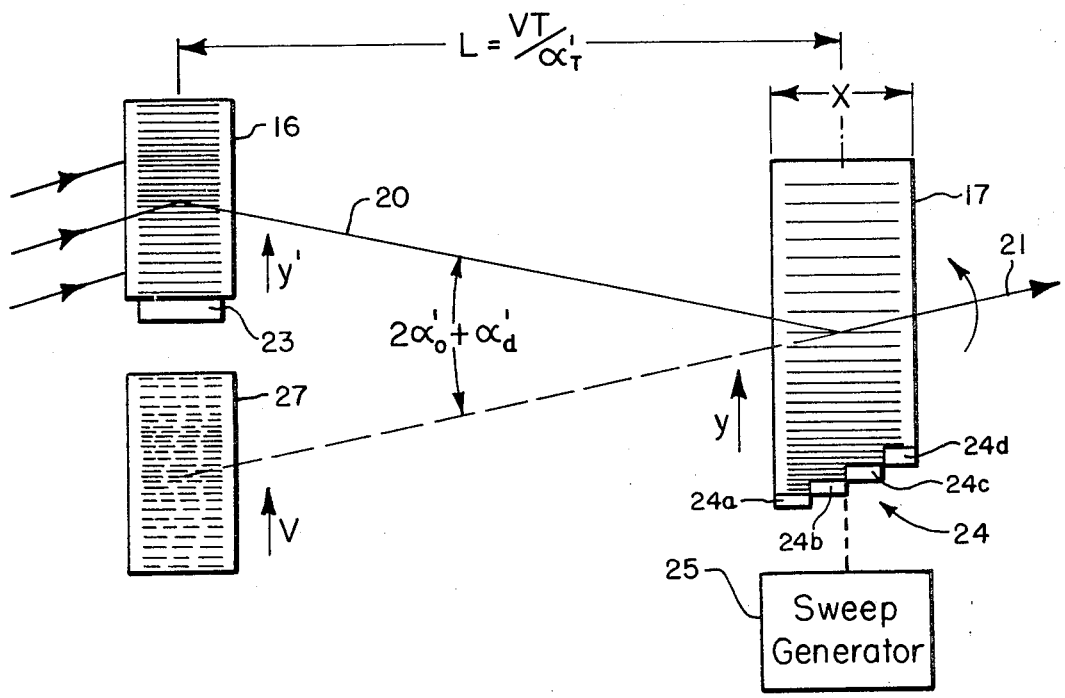
FIG. 2 is a schematic representation useful in understanding the operation of components which may be included in the system of FIG. 1.

With reference to FIG. 2, then, the beam of light from a laser, which may have been reduced in diameter by traversing first the objective lens and then the eye piece of a telescope, passes to a modulator 16. Some of the light of the incoming beam ordinarily travels straight through modulator 16, and, in this case, that portion of the light beam is not used. The significant portion of the incoming beam that is acted upon by the modulator is diffracted at an angle to the direction of the incoming beam and exits as a beam 20 which subsequently enters horizontal deflector 17. As explained in more detail in the references, it is preferred that the light in beam 20 be enlarged in cross-section by a telescope and passed through a cylinder lens before entering deflector 17, and that the diffracted light leaving deflector 17 along a path 21 traverse a second cylinder lens and another telescope that again reduces its beam diameter before entering the vertical deflector 18. The purpose of such an arrangement is to focus the beam to a wedge-shaped cross-over within deflector 17 in order to achieve more efficient deflection. In both modulator 16 and horizontal deflector 17 sound or acoustic waves are directed or guided across the path of the incoming light beam. Modulation or deflection, as the case may be, occurs because the sound waves intercept and interact with the light. The sound waves form a moving three-dimensional phase grating that diffracts the light. To this end, both modulator 16 and deflector 17 take the form of a light-sound interaction cell that is transparent to the light and is either filled with or composed of a medium such as water or a solid propagative of both light and sound. At one end of modulator 16 is transducer 23 which typically includes an x-cut quartz crystal slab sandwiched between conductive electrodes and across which a signal source is coupled. The signal source may be an oscillator that develops a carrier signal which, in turn, is modulated by intelligence from a video signal source that is to be displayed.

Similarly, horizontal deflector 17 includes a transducer 24 disposed at one end to launch acoustic waves into the medium of that interaction cell. While, as in the case of modulator 16, deflector 17 may have any of a variety of constructions, preferably it takes the specific form disclosed in the aforesaid copending application. In this arrangement, then, transducer 24 is in actuality an assembly of individual transducers 24a–24d disposed laterally adjacent one to the next and spaced from one to the next in the direction of sound propagation by one-half the wavelength at the center of the range of wavelengths through which the sound is varied to effect deflection. Additionally, transducers 24a–24d are so coupled to a sweep-signal generator 25 that adjacent ones of the transducers are instantaneously energized in phase opposition.

The purpose of utilizing such a transducer assembly arranged and energized as described is to cause the resulting composite sound wave fronts to tilt away from the position illustrated as the sound frequency changes so as to maintain more optimum angular orientation relative to the incoming light beam and thereby fully and efficiently diffract the light beam throughout the deflection sweep range. Additionally, when a single, flat transducer is used in deflector 17, the range of deflection angles available is substantially reduced over that obtainable with the construction here preferred. Also, the sound beam launched by transducer assembly 24 is comparatively wide in the direction of light travel and is of relatively narrow height in the direction perpendicular to the plane of the paper in FIG. 2, in corrspondence with the use of the aforementioned cylinder lenses in order to focus the beam to a wedge-shaped cross-over.

In both modulator 16 and deflector 17, the sound or acoustic wavefronts are caused to intercept the incoming light beam at least substantially at what is known as the Bragg angle $\alpha$. With thic relationship, the sound or acoustic wavefronts act like moving mirrors with the light being reflected from the mirrors at an exit angle equal to the incidence angle. Consequently, the light exits from the light-sound cells at the same angle $\alpha$ relative to the sound wavefronts and at an angle $2\alpha$ relative to the path of the undiffracted light. To understand the operation of the system more clearly, it is helpful to examine in more detail the relationships attendent to Bragg angle diffraction by means of light-sound interaction. For convenience, reference will be made to the angle $\alpha$ at deflector 17, although a corresponding Bragg relationship holds for the diffraction at modulator 16.

A signal modulated with video information is impressed across transducer 24 which in turn launches sound waves of individual period $\Lambda$ and width $x$ into the propagating medium of the cell. The direction $y$ of sound propagation, therefore, is selected in each cell relative to the direction of incoming light propagation to achieve Bragg diffraction. When the wavefront width $x$ is greater than the value $\Lambda^2/\lambda$, where $\lambda$ is the wavelength of the light, the incident light is diffracted only into a first order and this occurs to a significant degree when the directions of incident and diffracted light are at least approximately symmetrical with respect to the acoustic sound wavefronts. The angle between the diffracted and undiffracted light beams is equal to $2\alpha$, where $\alpha$ is the Bragg angle determined in accordance with the relationship:

$$\sin \alpha = \lambda/2\Lambda \qquad (1)$$

The light-sound cell is bounded by flat, parallel faces through which the light enters and leaves; these faces are at least approximately perpendicular to the acoustic wavefronts. With the cell disposed in air, the relation between the Bragg angle $\alpha'$ in air and the angle $\alpha$ in the actual sound propagating medium is determined by Snell's Law:

$$\sin \alpha'/\sin \alpha = n = \lambda'/\lambda \qquad (2)$$

where $n$ is the index of refraction of the propagating medium and $\lambda'$ is the light wavelength in air. Consequently, the externally observed Bragg angle is expressed:

$$\sin \alpha' = \lambda'/2\Lambda \qquad (3)$$

As defined herein, optical wavelengths and angles measured in air are designated by primed symbols. From Equation 3, the angle as measured in air between the undiffracted and diffracted light beams is $2\alpha'$.

Since the latter value depends upon the value of $1/\Lambda$ and hence on the acoustic frequency $f$, it is possible to vary the direction of the diffracted light in deflector 17 by changing the acoustic frequency and this is what occurs in the illustrated systems. As the frequency of the signal from sweep generator 25 is changed throughout a finite range, beam 21 similarly scans across screen 13 from one side to the other.

Because of the use of a telescope or the like as the projection lens in order to magnify the actual scanning, the needed change $\alpha_d$ of the diffraction angle $\alpha$ is very small; as herein described the diffraction angle $\alpha$ is less than one degree. For practical purposes, then, equation 1 may be rewritten $$\alpha = \lambda/2\Lambda \qquad (4)$$

For a sound wave of wavelength $\Lambda_0$ and a frequency $f_0$ traveling in the direction $y$ in the cell at a sound velocity $V$, the sound waves diffract the existing light into a new direction separated from the original direction of light propagation by an angle $$2\alpha_0 = \lambda\Lambda_0 = f_0\lambda/V \qquad (5)$$

For convenience, the exit angle for sound waves of frequency $f_0$ is defined as the center sound frequency of the range of frequencies over which the sound is changed in deflector 17 and corresponds to a nominal or center position of the beam exiting from that cell. For a change of frequency by an amount $\Delta f$, the exiting beam angle from cell 17 is changed by the amount $$\lambda \Delta f/V \qquad (6)$$

For a given maximum value of $\Delta f$ dependent upon the range of operation of transducer 24, there is a resulting maximum deflection angle $\alpha_T$. The diffracted beam has the same shape as the original beam and in the illustrated case also has uniform power density over the exiting aperture width $D$. Assuming spatial coherence across the aperture, the beam is spread only by diffraction with the first nulls of the far-field pattern separated from the central maximum by angles of $\pm \lambda/D$. Following conventional notation and defining the values $\lambda/D$ as the smallest resolvable angle $\alpha_{min}$, the resolution $N$ is expressed $$N = \alpha_T/\alpha_{min} = D\Delta f/V = \tau\Delta f \qquad (7)$$

where $\tau$ is the transit time of the sound wave across the aperture width $D$. It may be noted also that the value $\tau f_0$ represents the number of sound waves present within the aperture at an instant when the sound frequency $f = f_0$; the quantity $\tau \Delta f$, in Equation 7, is the number of waves added when the acoustic frequency is changed from its minimum to its maximum value. Correspondingly, the externally measured maximum deflection angle becomes $\alpha'_T = \lambda'\Delta f/V$ and the smallest resolvable angle $$\alpha'_{min} = \lambda'/D$$

The resolution $N$ remains the same.

When utilizing a linear scan as in the case of the deflection in a television system, the deflection angle $\alpha'_d$ is changed with a constant rate $$d/dt(\alpha'_d) = \alpha_T/T \qquad (8)$$

where $T$ in this example is the horizontal trace time. The deflection angle as a function of time and distance in the cell is therefore expressed:

$$\alpha'_d(t,y) = (\alpha'_T/T)(t-y/V) \qquad (9)$$

The distribution of deflection angles at any given instant is characterized by a gradient:

$$d/dy(\alpha'_d) = -\alpha'_T/VT \qquad (10)$$

which is independent of time $t$ and direction $y$. Thus, the deflection angle changes at a uniform rate along the $y$ axis, and the deflected light rays come to a focus at a constant distance $VT/\alpha'_T$. Consequently, the linear frequency-modulated sound wave acts as if there were an additional cylinder lens of fixed focal length in the system.

Since, then, the transit time $\tau$ may have substantial magnitude, an operating system is able to have a transit time conveniently the same as or at least approximately equal to the horizontal retrace blanking interval of present-day television standards. The acoustic frequency fed to deflector 17 is modulated with a sawtooth function having negligible fly-back time. The steep transient separating the end of one sawtooth from the beginning of the next travels across the entire aperture-width $D$ during the conventional television system blanking interval.

In addition to the optical aperture width $D$, it is also important to consider the optical length $x$ across the sound beam. As previously noted, the sound beam width $x$ must be greater than $\Lambda^2/\lambda$. Also to be considered are the acoustic power required to deflect all incoming light and the tolerance on the angle under which the light enters. These considerations are fully developed in application Ser. No. 600,500, filed Dec. 9, 1966 by Robert Adler and assigned to the present assignee.

Turning now in more detail to modulator 16, in a typical embodiment transducer 23 develops a sound beam in response to a carrier signal modulated with the video intelligence. In actual practice, the source of video may be the video amplifier of the conventional television receiver. That receiver also supplies the vertical and horizontal synchronizing and sweep signals, thereby including the function of sweep generator 25. Consequently, the overall system displays a standard television signal broadcast over the air, with modulator 16 horizontal deflector 17 and vertical deflector 18 together with the laser taking the place of the conventional cathode-ray tube and its directly auxiliary components. In that utilization, it is found that modulator 16 exhibits a generally S-shaped modulation characteristic. This may be compensated for by a simple, related nonlinear network included in the video circuitry of the receiver.

The light-sound interaction cells of modulator 16 and horizontal deflector 17 both cause diffraction of the light beam being operated upon and it is necessary to correlate the parameters of the interaction processes in order that the image of the deflected beam which is projected on screen 13 will be immovable. This principle of immobilizing the image on the screen is necessary whether the system be of the monochromatic or polychromatic type and is employed in the arrangements of the earlier developments referred to above. It is used here as well and will be described for completeness of disclosure. Thus, a succession of sound waves or a sound wave train is present within modulator light-sound cell 16. The incoming light beam has a sufficient width in the direction of sound propagation, indicated by the arrow labeled $y'$ in the representation of FIG. 2, to encompass several picture elements. Four such elements are shown within the aperture width of the light in FIG. 2 by means of alternating series of light and dark sound wavefronts. These elements, which move in direction $y'$ at sound velocity V, are imaged in the plane of screen 13 (FIG. 1) through deflector 17 by the projection lens 19. Neglecting the previously-mentioned cylinder lens effect of deflector 17 for convenience of illustration, the light beam is deflected in the deflector by an angle $2\alpha'_0 + \alpha'_d$. As a result, the beam emerging from deflector 17 appears to come from a virtual image 27 of the sound waves in modulator 16, as shown by the dashed sound wavefront pattern in FIG. 2.

Deflector 17 displaces the image caused by the diffracted light beam in the modulator but does not reverse that image; virtual image 27 still moves in direction $y'$ at velocity V. To immobilize this motion, the incremental deflection $\alpha'_d$ is caused to increase by a compensatory amount. The derivative of the deflection angle increases, or its rate of change, is $d/dt(\alpha'_d) = \alpha'_T/T$, where it will be recalled that $\alpha'_T$ is the maximum deflection angle and T is the horizontal trace time. In order to obtain the desired compensation in the system under discussion, it is necessary that the sound propagation velocity in cell 16 satisfy the relationship $$V = L\alpha'_T/T \quad (11)$$

where L is the center-to-center spacing of modulator 16 and deflector 17. In a given system where the sound velocity, the horizontal trace time and the maximum deflection angle of deflector 17 are determined in accordance with considerations independently selected with respect to the desired features or the desired characteristics of the individual light-sound cells and of the television system itself, the desired compensation or immobilization is obtained by selecting length L to satisfy the relationship $$L = VT/\alpha'_T \quad (12)$$

Having thus correlated the action of deflector 17 with the movement of the image in modulator 16 so as to immobilize the picture elements in the modulator imaged upon screen 13, the overall system of FIG. 1 operates to display a complete television image when the video information source is the video amplifier of the television receiver previously described. Moreover, with the distance L between the modulator and deflector selected in accordance with Equation 12, the previously-mentioned apparent cylinder-lens effect produced by the frequency-modulated wave in deflector 17 eliminates the astigmatism, which otherwise would be developed in modulator 16 and deflector 17, by placing the virtual image at infinity. Consequently, the modulation and deflection process is anastigmatic. This occurs because the quantity $VT/\alpha_T$ also is equal to the focal length of deflector 17.

Returning to FIG. 1, as shown therein the next component beyond the horizontal deflector 17 is the vertical deflector 18. While the vertical deflector may take various forms and indeed may itself be another light-sound interaction cell, because of the very-low vertical deflection rate in television systems the illustrated system employs a conventional optical system including a mirror which is caused to tilt at the vertical rate by a galvanometer element. Moreover, because it is so relatively easy to obtain the necessary vertical deflection without further magnification of the vertical deflection angle imparted to the beam by that deflector, in actual practice it is preferred to dispose the vertical deflector beyond the projection lens. However, for clarity of illustration of the projection of the resultant image upon screen 13, the projection lenses in FIG. 1 have been shown downbeam from the vertical deflector.

Figure 3:
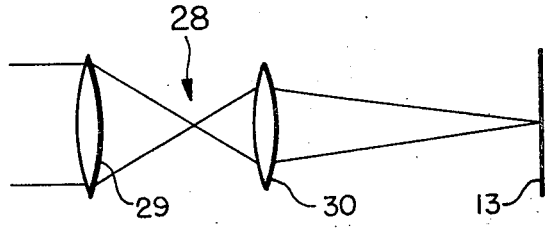
FIG. 3 is a schematic representation of another component which may be used in the system of FIG. 1.

Each of the projection lenses 19a–19c need only be a simple convergent lens to project the diffracted beam onto screen 13, while at the same time serving to magnify at least the horizontal deflection angle imparted by deflector 17. However, it may be preferred to utilize a slightly more complex optical assembly such as telescope 28 of FIG. 3 which has an eye-piece 29 and an objective lens 30. The deflection angle introduced by deflector 17 is magnified by telescope 28 in correspondence with the magnification power of the telescope. This enables image screen 13 to be brought that many times closer. As mentioned before, a similar but reversely-positioned telescope also is preferably disposed in the beam path between modulator 16 and deflector 17. That telescope enables the distance L (FIG. 2) to be reduced by an amount corresponding to its magnification power.

In telescope 28, the distance from eye-piece 30 to its focal point may be denoted $d_0$ and the distance from that focal point to objective lens 29 may be denoted $d_e$. The magnification M is equal to $d_0/d_e$. With respect to the amount of light transmitted by the telescope, the F number of the lens in the system is equal to its focal length divided by its useful aperture diameter. When the optical system must be designed to utilize minimum-sized optical components for the necessary apertures, it is desirable for translation efficiency that the F numbers of the two lens elements be the same.

In utilization of the system as thus far discussed, each beam spot formed on image screen 13 is a conventional image of a corresponding spot in modulator 16. Because of this, the light source need not produce a beam of light that is coherent in the horizontal direction, although with a laser that is the case. However, spatial coherence is still desired in the vertical direction in order to produce a small spot on the image screen. Nevertheless, because the vertical deflection is so easily obtained in view of its slow rate, the requirement of vertical spatial coherence may be somewhat relaxed. The beam of light utilized should have good collimation to prevent loss of light and each beam should exhibit a monochromaticity of the order of at least one part in one thousand in view of the requirements of acoustic deflector 17.

Ideally, for ease of adjustment, identity of resolution in each of the three images that are to be superimposed and convenience of fabrication and servicing, systems 10, 11 and 12 preferably would be identical except for the color of light produced and the necessary correction in the projection lens for astigmatism. Unfortunately, such an approach results in misregistration of the three images projected on display screen 13 because of the fact that the diffraction effect of the interaction cells in modulator 16 and deflector 17 is a function of the wavelength of the light beam being operated upon which manifests itself in differences in horizontal size of the three images projected on screen 13. Those differences in turn are a direct result of the necessary condition that the three light beams be light of different wavelengths. From Equation 6, it will be observed that the change in angle of the beam exiting from deflector 17 for a given change in acoustic frequency is directly proportional to the light wavelength. Consequently, the resulting size of the image developed by the shortest-wavelength light, the blue light from laser 14c, is smaller than that of the image developed by the longer-wavelength light, the red light from laser 14a.

Similarly, the size of the image formed by the green light from laser 14b is intermediate the other two. To overcome this difficulty while yet retaining identity of function of the other components in the several monochromatic systems, it is contemplated in a first aspect of the invention to assign different magnification powers to projection lenses 19a–19c. Thus, the magnification power of lens 19c is the largest, that of lens 19a is the smallest and the power of lens 19b is intermediate that of the other two. The ratio of those powers is in direct proportion to the wavelength ratios between the light in the different beams in order to compensate the dependence of the diffraction effect on light wavelength.

As an alternative to proportioning the magnification power of the lenses, the desired compensation and registration of the three different images may be achieved by utilizing different propagating mediums in each of horizontal deflectors 17a–17c so as to obtain different acoustic-wave propagation velocities. Again with reference to Equation 6, it will be observed that the change in exiting beam angle is inversely proportional to the acoustic-wave velocity. Consequently, the shortest wavelength light is caused to interact in deflector 17c with the slowest acoustic-wave velocity exhibited in the three horizontal deflectors; that is, the slowest acoustic-wave velocity is assigned to horizontal deflector 17c which acts upon the blue light. As between the three horizontal deflectors 17a–17c, the ratio of the acoustic-wave velocity therein is made directly proportional to the wavelength ratio between the light in the three different beams.

As one example of this different-wave-velocity approach, the propagating mediums in each of horizontal deflectors 17a–17c may include lead glass. In that medium, sound velocity is a function of the percentage of lead added to the glass and the lowest sound velocity is obtained with the highest lead content. While the velocities may thus be properly proportioned merely by adjusting the lead content as between the three different deflectors, at the same time the beam intensities must be correspondingly adjusted, since the lead content in the glass imparts a degree of attenuation. Accordingly, the blue light, which requires the highest lead content, is attenuated the most in its horizontal deflector and, therefore, the blue beam is caused to have a correspondingly greater intensity than the other two beams.

In still another aspect of the invention, in order to maintain registration of the three superimposed images, different sweep widths, or different amounts of change of acoustic-wave frequency, may be resorted to in order to compensate the registration differences otherwise attributable to deflectors 17a–17c. To that end, the blue beam, which otherwise would cast the smallest image, is caused to interact with acoustic waves varying over the largest range of frequencies. Again, the ratio of the sweep widths in the three different horizontal deflectors is then chosen to be the same as the ratio between the light wavelengths.

Figure 4:
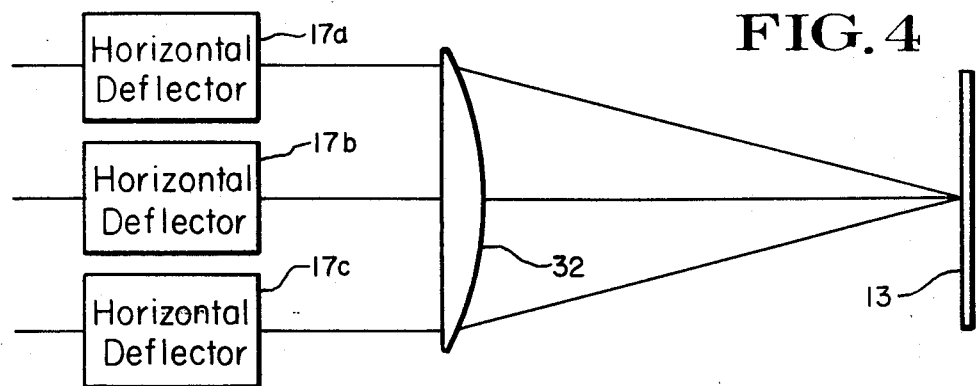
FIGS. 4–7 are schematic diagrams of alternative arrangements of portions of the system of FIG. 1.

In utilizing either of the last two approaches, varying the acoustic wave velocity or the sweep width in the horizontal deflector, a particularly attractive attendant advantage is the capability of being able to utilize a common optical system for the three beams, in place of the three separate projection lenses of FIG. 1. This is illustrated in FIG. 4 which is simplified to depict only a portion of the light paths, horizontal deflectors 17a–17c, image screen 13 and a single convergent lens 32 which serves to project and magnify the deflection angles of all three beams equally. Of course, convergent lens 13 may be replaced by any other ordinary optical projection system.

Figure 5:
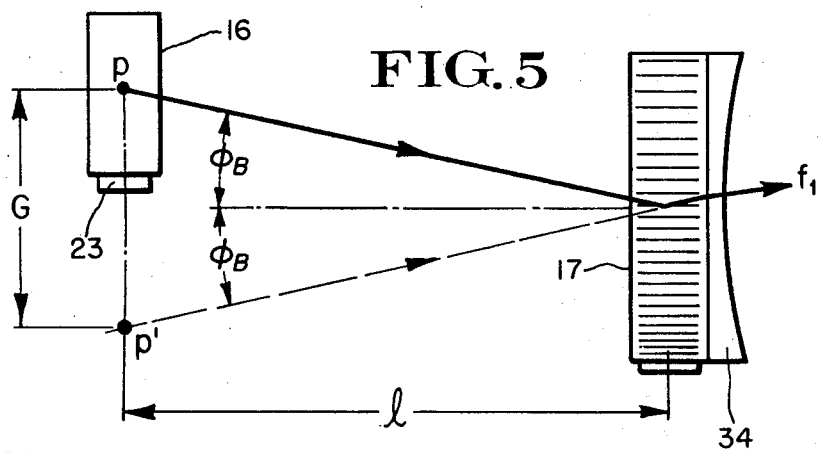

As still a different approach to securing registration of the three differently-colored images projected upon screen 13, each horizontal deflector may be provided with a lens of the same power and character but of opposite sign to that of the lens effect created by the deflector itself. That is, as mentioned above, when the frequency of the acoustic waves in deflector 17 varies linearly, the deflector acts upon the light as a cylinder lens. Consequently, a cylinder lens of the opposite sign may be positioned either before or after the deflector. As shown in FIG. 5, a negative cylinder lens 34 is contiguous with and affixed to the downbeam wall of deflector 17.

More particularly, the horizontal deflector acts, in effect, as a positive cylinder lens that moves at the sound velocity along with the acoustic waves in deflector 17. It can be shown that the focal length $l$ of that effective cylinder lens is $$l = \frac{V^2}{\lambda} \left(\frac{df}{dt}\right)^{-1} \qquad (13)$$

where V again is sound velocity, $\lambda$ is the light wavelength and $df/dt$ is the slope of the frequency-time sweep characteristic. This effective cylinder lens is located the distance $l$ away from modulation sound cell 16 so as to project a virtual picture at infinity of the information contained in the modulator sound cell. Because both the video information and the effective cylinder lens move with the direction of sound wave propagation in modulator 16, the virtual picture is stationary. As seen from Equation 13, the focal length of the effective cylinder lens in deflector 17 depends upon the wavelength of the light. Consequently, without some sort of compensation, the angular size of the virtual image at infinity is different for light of different colors. By employing fixed cylinder lens 34, which has a power the same as that of the effective cylinder lens within deflector 17 but of opposite sign, the virtual picture that was located at infinity instead becomes a virtual picture at the modulator sound cell 16. Moreover, the size of that virtual picture is no longer dependent upon the wavelength of the light. Consequently, by employing the combination of deflector 17 and negative-cylinder lens 34 for each of deflectors 17a–17c in FIG. 1, the three differently-colored images formed upon screen 13 are of essentially the same size and thus are in registration. Assuming the separation between systems 10, 11 and 12 in FIG. 1 is in a vertical direction, that vertical separation does not pose any difficulty because imaging is done from infinity. Of course, astigmatic optics are still required for at least two of the projection lenses, but those optics may be the same for all colors or wavelengths of the light.

To understand perhaps more fully the conditions attendant to the use of cylinder lens 34, it is helpful to analyze its effect in greater detail. An easy approach to such analysis is to recognize that the light ray going through the center of lens 34 is not further refracted by that lens. Thus, as illustrated in FIG. 5, at a time $t_1$, an acoustic wave of frequency $f_1$ is in the center of deflector 17 opposite the center of fixed cylinder lens 34. Also in that figure, two light rays are drawn relative to the plane of the acoustic waves in deflector 17 at the Bragg angles $-\phi_B$ and $+\phi_B$ where, $$2\phi_B = \frac{\lambda f_1}{V} \qquad (14)$$

These two light rays define the image point P in modulator cell 16 and its virtual image P'. The displacement G between the point P and P' is given by the expression:

$$G = 2\phi_B L = V f_1 \left(\frac{df}{dt}\right)^{-1} \qquad (15)$$

Equation 15 demonstrates that the position of the virtual image is independent of the wavelength of light.

It is instructive to observe what happens when certain of the components are moved in the vertical direction (go to the top of the paper in FIG. 1). When the modulator is moved upwardly, the virtual image moves up by the same amount. This, then, indicates an easy way of aligning the three pictures formed by systems 10, 11 and 12 in FIG. 1. When both the deflector 17 and fixed lens 34 are moved vertically, the virtual image stays in the same place. This indicates that the deflector compensated with the fixed cylinder lens can be freely moved without affecting alignment of the resulting images; that freedom of movement is advantageous in enabling positioning of the horizontal deflector in order to obtain maximum efficiency.

Another observation is that movement of deflector 17 without a corresponding movement of lens 34 results in displacement of the virtual image. The virtual image also is displaced but in the opposite direction when the fixed lens is moved while deflector 17 remains stationary. These observations demonstrate the importance of maintaining proper time delays in the three different sweep systems driving the horizontal deflectors.

All these observations indicate the existence of a wide choice of comparatively simple adjustments that, of course, are important because a differential time delay of only about one-tenth of a microsecond between any of the different sweeps or the different modulating signals is sufficient to cause misregistration by one resolvable point. As noted, such a difference can be compensated, merely by adjusting the relative positioning of the components discussed.

Most critical in the system of FIG. 5 is the curvature of the compensating cylinder lens 34 and its position. However, difficulty with that criticality may be avoided by utilizing a combination of multiple lenses, such as a combination of one positive cylinder lens with one negative cylinder lens together with means to change the spacing between them in order to alter their combined effective focal lengths. An alternative method of compensating or adjusting cylinder-lens focal length involves the use of two light-sound interaction cells spaced along the beam path, as disclosed in more detail and claimed in the copending application of Robert Adler, Ser. No. 476,797, filed Aug. 3, 1965.

Figure 6:
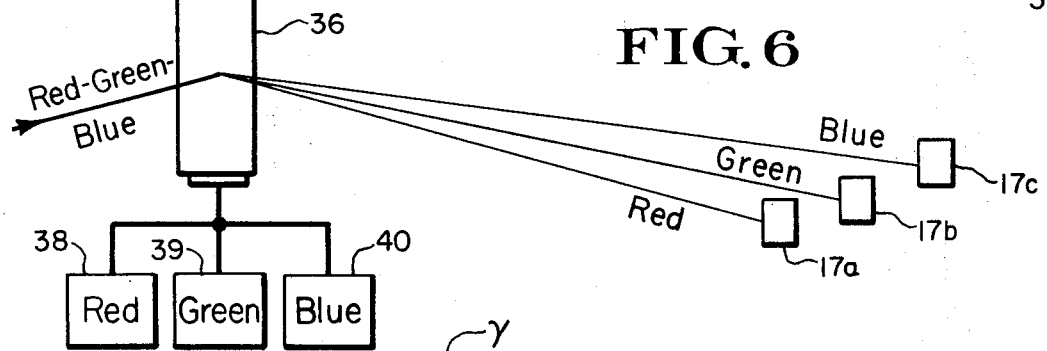

As thus far considered, the overall system has been one in which three video modulators have been employed, one for each beam. It is contemplated also to combine those three modulators into one modulator 36 as depicted in FIG. 6. As there shown, the red, green and blue beams arrive at modulator 36 along a coincident path. The three beams may be produced either by a single laser or by the combination into a single path of light beams originating in three different lasers. Since as shown in Equation 4, the angle of diffraction is directly proportional to the wavelength of the light, the action of modulator 36 results in diffracting the three different wavelengths or colors of light into three angularly-separated beams. Accordingly, deflectors 17a, 17b, and 17c must be located at different positions as shown in FIG. 6. Nevertheless, as observed above in connection with the discussion of FIG. 5 and the movement of both deflector 17 and compensating lens 34, such repositioning of the horizontal deflectors as shown in FIG. 6 does not change the position of the virtual image.

Utilizing common modulator 36, the video information is supplied in common to a wide-band transducer 37 with three different signals from modulated carrier sources 38, 39 and 40 individually providing information as to one of three different colors, each is modulated with the video information corresponding to its respective color. The three different carrier frequencies are proportional to the different wavelengths of the light. For example, utilizing as the light source an Argon laser which exhibits radiation in three different spectoral lines, the two extreme wavelengths differ by twenty-three percent. Accordingly, the two extreme carrier signals in the FIG. 6 system would likewise differ in frequency by twenty-three percent. Care should be taken to insure that there is no cross-talk between the different color-modulated signals; that is, each carrier should be modulated only with the different information pertaining to the color it represents. In order to obtain the necessary bandwidth of the transducer, a stepped assembly, analogous to transducer 24 of FIG. 2, may be employed; by varying the height and width of the steps in such a transducer, the response characteristic to the video signals may be shaped as desired.

Figure 7:
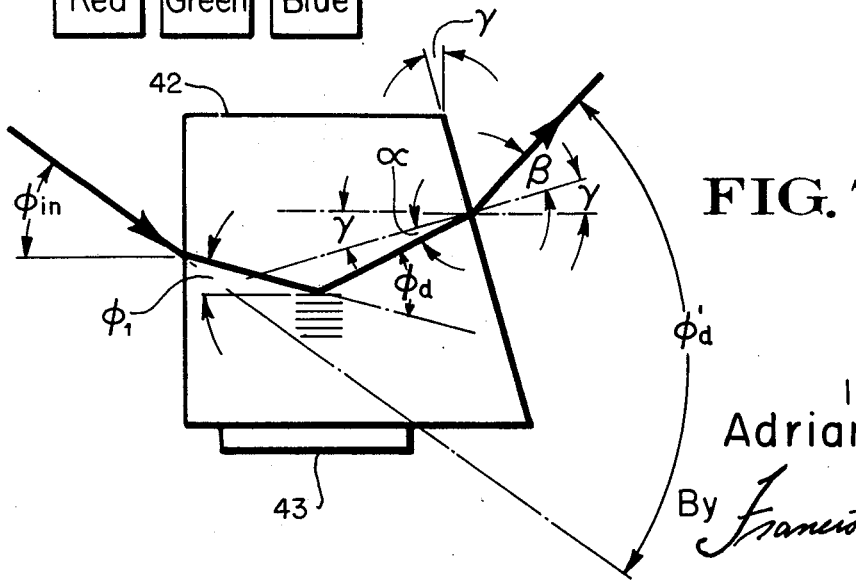

In yet another modification of the individual horizontal deflectors in order to obtain accurate registration of the three different images, the rate of deflection for the three different colors is equalized by associating with or forming each horizontal deflector to act as a prism. To this end, light-sound interaction cell 42 in FIG. 7 is composed of a material such as glass as the sound propagating medium and the downbeam sidewall of the interaction cell is formed or cut to define an angle $\gamma$ to the upbeam sidewall of the deflector. That is, the entire cell is a prism having an apex angle $\gamma$.

In more detail, light comes into deflector 42 from the left at an angle $\phi_{in}$ which corresponds to an angle $\phi_1$ inside the glass material. The angle $\phi_1$ is chosen to be of the order of the desired Bragg angle. The sound waves caused to propagate by transducer 43 than diffract the incoming light at angle $\phi_d = \lambda f/V$, where $\lambda$ is the light wavelength inside the medium. The light leaves deflector 42 at an angle $\beta + \gamma$ with respect to the horizontal as shown in the figure. The total deflection angle $\phi_d'$ thus is the sum $\beta + \gamma + \phi_{in}$. From the diagram in FIG. 7, it may be noted that the following relations are established:

$$\alpha = \phi_d - \phi_1 - \gamma \qquad (16)$$

$$\sin \beta = n \sin \alpha \qquad (17)$$

Of particular interest to determining the deflection rate in order to equalize total angular deflection and thus achieve registration when deflectors, like those of FIG. 7, are utilized in the system of FIG. 1, it is instructive to analyze the rate of change of $\phi_d'$ with $\phi_d$. Because $\phi_1$ and $\gamma$ are constant $$\frac{d\phi_d'}{d\phi_d} = \frac{d\beta}{d\alpha} \qquad (18)$$

It will also be observed that:

$$\cos \beta \, d\beta = n \cos \alpha \, d\alpha \qquad (19)$$

Hence, $$\frac{d\phi_d'}{d\phi_d} = \frac{d\beta}{d\alpha} = n\frac{\cos \alpha}{\cos \beta} = n\frac{\cos(\phi_d - \phi_1 - \gamma)}{\sqrt{1 - n^2 \sin^2 (\phi_d - \phi_1 - \gamma)}} \qquad (20)$$

The magnification M is defined such that $$\frac{d\phi_d'}{d\phi_d} = Mn \qquad (21)$$

and $$M = \frac{\cos \alpha}{\cos \beta} \qquad (22)$$

To estimate the required apex angle $\gamma$, it may be assumed that $\phi_d$ and $\phi_1$ are very small compared to $\gamma$. Hence:

$$M = \frac{\cos^2 \gamma}{\sqrt{1 - n^2 \sin \gamma}} \qquad (23)$$

and $$M^2 = \frac{\cos^2 \gamma}{1 - n^2 \sin^2 \gamma} = \frac{1 - \sin^2 \gamma}{1 - n^2 \sin^2 \gamma} \qquad (24)$$

or $$\sin^2 \gamma = \frac{M^2 - 1}{M^2 n^2 - 1} \qquad (25)$$

As an example, utilizing a material such as glass having an index of refraction of approximately 1.7 and a value of $M^2$ of about 1.5 in order to obtain a twenty-three percent correction in deflection rate, Equation 25 reveals that the apex angle $\gamma$ need be only 22 degrees. It may also be shown that aberration, that is, in how far M remains constant as $\phi_d$ changes, also is reasonably small in a typical example. Moreover, in a case in which the wavelengths and materials utilized result in excessive aberration, the latter may be reduced by employing two prisms in series with the second being arranged to have an opposite sign so as to cancel the aberration.

Several different approaches and combinations of approaches have been described all with the same purpose in mind, that is, of more easily and readily obtaining registration between images projected in a plurality of different colors by apparatus that involves light-sound interaction both for modulation and deflection, in at least one direction, of the light. Each of the different embodiments is attractive in its simplicity and comparative ease of adjustment. The different techniques disclosed herein enable the adaptation of apparatus, already successfully employed for the production of monochrome television images, to the production of polychrome or multicolor images.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

I claim:

1. A polychrome image display system comprising: means for effectively producing a plurality of beams of monochromatic light individually of different respective wavelengths related to one another to simulate natural color by their superpositioning;

modulating means for directing across said beams a corresponding plurality of acoustic waves individually having intensity variations representing an asssigned color field of an image being translated to develop a plurality of correspondingly modulated light beams;

deflection and imaging means disposed downbeam of said modulating means for directing across said modulated beams acoustic waves of sound energy the frequency of which varies cyclically over a predetermined range to effect periodic scanning displacement of said modulated beams in accordance with a predetermined pattern and also for imaging said deflected beams upon an image plane spaced downbeam of said deflecting means;

optical means included in said deflection and imaging means for effecting superpositioning the images of said deflected beams in said image plane;

the diffraction effect of said modulating and deflecting means being a function of the wavelength of the light beam being operated upon and tending to cause misregistration of said superposed images;

and means included in said modulating or deflecting means for compensating the dependence of said diffraction effect on wavelength to avoid misregistration in said superposed images.

2. A polychrome image display system in accordance with claim 1 in which said compensating means is included in said optical means to provide a ratio of magnification of said superposed images in direct relation to the ratio of light wavelengths said of plurality of beams.

3. A polychrome image display system in accordance with claim 2 in which said optical means includes a corresponding plurality of projection lenses individually imaging an assigned one of said deflected beams onto said image plane.

4. A polychrome image display system in accordance with claim 3 in which the frequency variations of the acoustic waves in said deflection means provides the effect of a cylinder lens of fixed focal length and in which said optical means provides another cylinder lens, similar to the first-mentioned cylinder lens, but of opposite optical effect.

5. A polychrome image display system in accordance with claim 1 in which said compensating means comprises a plurality of prisms having angles proportioned relative to said light wavelengths to avoid misregistration.

6. A polychrome image display system in accordance with claim 1 in which said deflecting means comprises a corresponding plurality of light-sound interaction devices and in which the acoustic wave propagation velocities of said devices are related to the light wavelengths of said beams to effect compensation and registration of said superposed images.

7. A polychrome image display system in accordance with claim 6 in which the propagation velocity is determined by the concentration of an ingredient of the wave propagating medium of said devices, in which said ingredient also has an attenuating effect on said light beams, and in which the relative intensity of the light beams as applied to said deflection means further compensates for differences in attenuation exhibited by said interaction devices.

8. A polychrome image display system in accordance with claim 1 in which said deflecting means comprises a corresponding plurality of light-sound interaction devices having the same acoustic wave propagation velocity but in which the range of frequency variations of the acoustic waves in said cells is proportioned relative to the wavelengths of said light beams to effect compensation and registration of said superposed images 9. A polychrome image display system in accordance with claim 1 in which said optical means comprises a projection lens common to all of said beams and in which said compensation is effected in the system prior to the location of said common projections lens.

10. A polychrome image display system in accordance with claim 1 in which said plurality of beams are delivered along a common path to said modulating means and in which said modulating means diffracts said beams different amounts so that modulated beams exit from said modulating means along a plurality of separate light paths.

References Cited

UNITED STATES PATENTS 3,431,504    3/1969    Adler _____ 350—161
3,457,425    7/1969    Preston _____ 350—161

RICHARD MURRAY, Primary Examiner

J. C. MARTIN, Assistant Examiner

U.S. Cl. X.R.

350—161; 250—199